United States Patent [19]

Hageman

[11] Patent Number: 5,274,867
[45] Date of Patent: Jan. 4, 1994

[54] HYDRAULICALLY OPERATED EDGE-OF-DOCK LEVELER

[75] Inventor: Martin P. Hageman, Mequon, Wis.

[73] Assignee: Kelley Company Inc., Milwaukee, Wis.

[21] Appl. No.: 814,008

[22] Filed: Dec. 26, 1991

[51] Int. Cl.⁵ .............................................. E01D 1/06
[52] U.S. Cl. ..................................... 14/71.7; 414/537
[58] Field of Search ..................... 14/71.1, 71.3, 71.7; 414/537, 584, 572; 49/70

[56] References Cited

U.S. PATENT DOCUMENTS

| | | | |
|---|---|---|---|
| 3,665,537 | 5/1972 | Turner | 14/71.7 |
| 3,685,077 | 8/1972 | Wiener et al. | 14/71 |
| 3,933,256 | 1/1976 | Fagerlund | 14/71.7 |
| 4,365,374 | 12/1982 | Bennett | 14/71.7 |
| 4,665,579 | 5/1987 | Bennett et al. | 14/71.1 |
| 4,776,052 | 10/1988 | Delgado et al. | 14/71.7 X |
| 4,823,421 | 4/1989 | Kleynjans et al. | 14/71.7 X |
| 4,827,549 | 5/1989 | Walker | 14/71.7 |
| 4,944,062 | 7/1990 | Walker | 14/71.3 |
| 4,955,923 | 9/1990 | Hageman | 14/71.7 |
| 4,979,253 | 12/1990 | Alexander | 14/71.7 |
| 5,148,751 | 9/1992 | Alten et al. | 14/71.7 |

*Primary Examiner*—Kenneth J. Dorner
*Assistant Examiner*—Nancy Connolly
*Attorney, Agent, or Firm*—Andrus, Sceales, Starke & Sawall

[57] ABSTRACT

A hydraulically operated edge-of-dock dock leveler including a deck plate having its rear edge hinged to the dock and an extension lip is hinged to the front edge of the deck plate. In the storage position the deck plate is located in a generally horizontal position and the lip hangs downwardly in a generally vertical pendant position. A hydraulic cylinder unit interconnects the frame of the dock leveler with the deck plate and extension of the cylinder unit acts to move the deck plate to a generally vertical position where a latch that is pivotally connected to the underside of the lip engages an abutment on the frame to lock the deck plate in the vertical position. Retraction of the cylinder unit will pull the deck plate down and the linkage between the deck plate, the lip and the frame enables the outer edge of the lip to move in a generally curved path into engagement with the bed of a carrier. The hydraulic system for operating the cylinder unit includes a valve mechanism and when the cylinder unit is fully extended, as the deck plate is pivoted upwardly, the pressure increase in the hydraulic system shifts the valve and automatically retracts the cylinder unit.

8 Claims, 2 Drawing Sheets

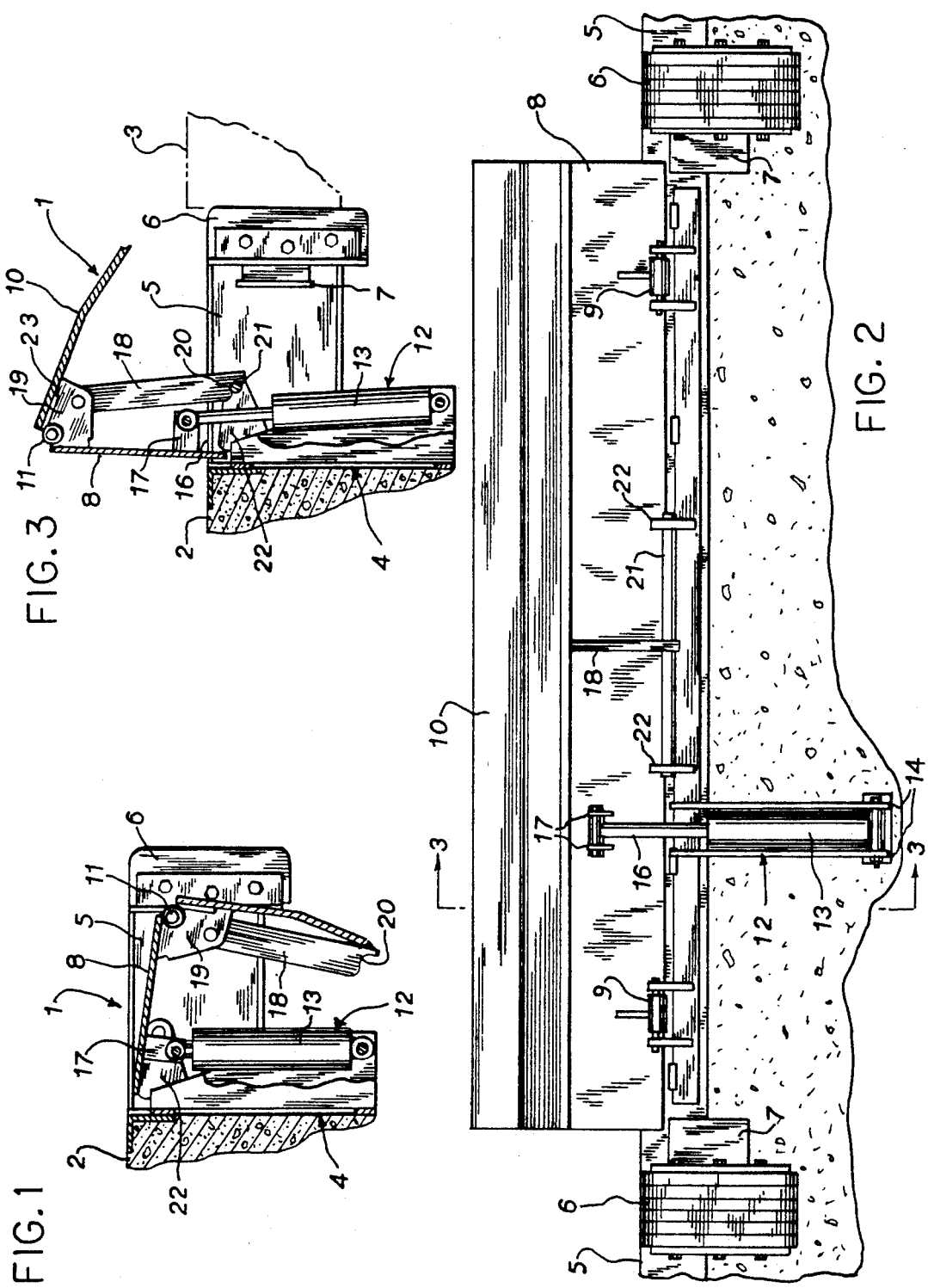

HYDRAULICALLY OPERATED EDGE-OF-DOCK LEVELER

BACKGROUND OF THE INVENTION

Loading docks are frequently equipped with dock levelers that act to bridge the gap and height difference between the dock and the bed of the truck to enable material handling equipment, such as a fork lift truck, to move between the dock and the truck bed. One common form of dock leveler is what is referred to as an "edge-of-dock" type. With this type of dock leveler, no pit or recess is required in the loading dock and the dock leveler is mounted on the front vertical face of the dock.

A typical edge-of-dock dock leveler as disclosed in U.S. Pat. No. 3,685,077 is composed of a deck plate and an extension lip. The rear edge of the deck plate is hinged to the dock, while the lip is pivoted to the forward edge of the deck plate. In the storage position, the dock leveler is located in a generally horizontal position, while the lip assumes a pendant position in which it hangs downwardly in front of the dock.

As disclosed in the aforementioned patent, when it is desired to move the dock leveler to the operating position, the deck plate is manually pivoted upwardly to a generally vertical position, and a latch pivotally attached to the underside of the lip engages a rod or abutment on the dock leveler frame to lock the deck plate in the upper vertical position. In this upper position, the lip is located at an acute angle with respect to the deck plate and the upper edge of the lip is located above dock level. The deck plate is then manually forced outwardly away from the dock and the linkage between the deck plate and the lip and the supporting frame enables the outer edge of the lip to inscribe a generally curved path and move into engagement with the bed of a carrier or truck. In moving in this curved path, the outer edge of the lip initially moves upwardly, thereby ensuring that the lip will clear the bed of the truck, and then downwardly into engagement with the truck bed.

In use of the edge-of-dock dock leveler, as described in U.S. Pat. No. 3,685,077, the deck plate is pivoted to the vertical position manually by an operator standing on the dock and using a long bar or implement which engages the deck plate and pivots it to the vertical position. After the latch is engaged, the deck plate and lip are manually pushed forwardly to bring the lip into engagement with the truck bed. As the deck plate and lip have a substantial weight it is difficult to pivot the deck plate to the vertical position and then push the deck plate and lip forwardly. Therefore, there has been a need for an inexpensive, power operated mechanism to pivot the deck plate upwardly to its vertical position and then move the lip forwardly to its extended position on the truck bed.

SUMMARY OF THE INVENTION

The invention is directed to a hydraulically operated edge-of-dock dock leveler utilizing a hydraulic cylinder unit which is programmed to operate automatically in a reciprocating sequence. More specifically, the dock leveler includes a deck plate having its rear edge hinged to the frame of the dock leveler, while an extension lip is pivoted to the forward edge of the deck plate. In the storage position, the deck plate is in a substantially horizontal position with the lip hanging downwardly in a pendant position.

In accordance with the invention, a hydraulic cylinder unit interconnects the frame of the dock leveler and the deck plate and in a preferred form of the invention, a cylinder is pivotally connected to the frame, while a piston rod extends from the upper end of the cylinder and is pivotally connected to the underside of the deck plate.

To raise the deck plate to its generally vertical position, pressurized hydraulic fluid is supplied to both ends of the cylinder. As the lower surface of the piston has a greater surface area against which the pressurized fluid acts than the upper surface, the piston will move upwardly in the cylinder to extend the piston rod and move the deck plate to the vertical position where it is latched by engagement of a latch with an abutment on the frame.

When the piston rod reaches its extended stroke of travel, the pressure in the cylinder will increase and the increased pressure will operate a two-position, three-way valve to connect the lower end of the cylinder with the hydraulic reservoir. The pressure in the upper end of the cylinder will then move the piston downwardly in the cylinder, causing the piston rod to retract and thereby move the deck plate downwardly. As the latch is engaged, the linkage between the deck plate and the lip will move the outer edge of the lip in a generally curved path until the lip engages the bed of a truck or carrier parked in front of the loading dock. With the lip engaged with the truck bed, operation of the pump can then be terminated, and a shuttle valve enables the hydraulic fluid to be released to the reservoir at atmospheric pressure.

Through use of the invention, the deck plate is automatically pivoted to the vertical position and is then moved outwardly to engage the lip with the truck bed through use of the hydraulic system, thus eliminating the manual labor that was required in manually operated edge-of-dock dock levelers in the past.

The invention incorporates a simple and effective hydraulic system which automatically sequences the hydraulic cylinder unit to pivot the deck plate upwardly to the vertical position and then move the deck plate and lip forwardly to provide engagement of the lip with the truck bed. The automatic sequencing is accomplished without the need for limit switches, sensors, or complicated valving arrangements.

Other objects and advantages will appear in the course of the following description.

DESCRIPTION OF THE DRAWINGS

The drawings illustrate the best mode presently contemplated of carrying out the invention.

In the drawings;

FIG. 1 is a vertical section of the dock leveler of the invention with the deck plate and lip being shown in the storage position;

FIG. 2 is a front elevation of the dock leveler of the invention with the deck plate being shown in the vertical position'

FIG. 3 is a vertical section similar to FIG. 1 and taken along line 3—3 of FIG. 2;

DESCRIPTION OF THE ILLUSTRATED EMBODIMENT

Figure 4:
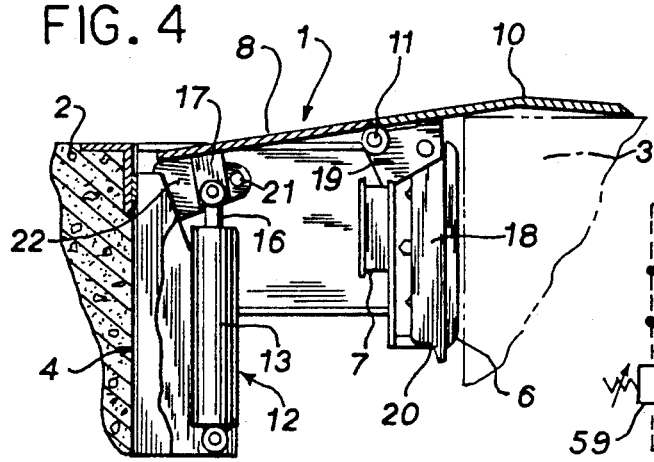
FIG. 4 is a view similar to FIG. 3 showing the lip in engagement with a truck bed.

As shown in FIGS. 1-4, an edge-of-dock dock leveler 1 is mounted on the front surface of a loading dock 2 and is adapted to bridge the gap between the dock and the bed of a truck or carrier 3 located in front of the dock.

Dock leveler 1 can be constructed as shown in U.S. Pat. No. 3,685,077 and includes a structural frame indicated generally by 4 and a pair of box-shaped weldments 5 are secured to the ends of frame 4. Located on the front surface of each weldment 5 is a resilient bumper 6.

A stop plate 7 is welded to the inner edge of each weldment 5 and extends laterally inward to a position where it can function as a cross traffic stop, as will be hereinafter described.

Dock leveler 1 also includes a deck plate 8 having its rear edge connected to frame 4 by hinges 9. The hinge connection, as described in the aforementioned patent, permits the deck plate to be pivoted with respect to the dock and also enables the deck plate to float vertically with respect to the dock when the deck plate is in the operating position.

A lip 10 is pivoted to the forward edge of deck plate 8 by hinges 11. The hinge connection enables the lip 10 to pivot downwardly with respect to the deck plate 8, but prevents the lip from pivoting upwardly beyond an extended position in which it extends outwardly from the deck plate in substantially a common plane.

The dock leveler is shown in the storage position in FIG. 1. In this position, deck plate 10 is slightly below horizontal with the side edges of the deck plate bearing on the upper edges of stops 7. Due to the pivotal connection between lip 10 and deck plate 8, the lip will assume a generally vertical or pendant position, in which it hangs downwardly from the deck plate.

The deck plate 8 is adapted to be pivoted upwardly to a position where the pendant lip 10 will clear the bed of carrier 3 located in front of the dock and the deck plate and lip are then moved forwardly to an operating position where the lip will engage the bed of the carrier, as shown in FIG. 4.

The deck plate 8 and lip 10 are moved between the storage positions and operating positions by a hydraulic cylinder assembly indicated generally by 12. The cylinder assembly includes a cylinder 13, the lower end of which is pivotally connected to lugs 14 on frame 4. A piston 15 is mounted for sliding movement in cylinder 13 and carries a piston rod 16 which extends through the upper head of the cylinder and is pivotally connected to a pair of lugs 17 on the undersurface of deck plate 8. Extension of piston rod 16 will pivot the deck plate from the horizontal storage position to the upper vertical position, as shown in FIG. 3, and conversely, the retraction of the piston rod 16 will pivot the deck plate downwardly.

To actuate the lip, a latching bar 18 is employed. The upper end of latch bar 18 is pivotally connected to the undersurface of lip 10 through lugs 19, while the lower or opposite end of the latch bar is formed with a notch 20 that is adapted to engage a fixed horizontal rod 21 attached to frame 4, as the deck plate 8 is elevated to the vertical position. Rod 21 is carried by a pair of lugs 22 that extend outwardly from the frame 4.

In the storage position, as illustrated in FIG. 1, latch bar 18 hangs downwardly and as the deck plate 8 is pivoted upwardly, the latch bar rides along the rod 21 until the notch 20 falls into engagement with rod 21. With the notch engaged with the rod, the deck plate will be latched in the vertical position. In this position, as shown in FIG. 3, the lip will be at an acute angle with respect to the deck plate 8 and the lugs 19 are shaped, so that the ends 23 of the lugs engage the undersurface of the deck plate 8 to hold the lip at the acute angle.

Figure 5:
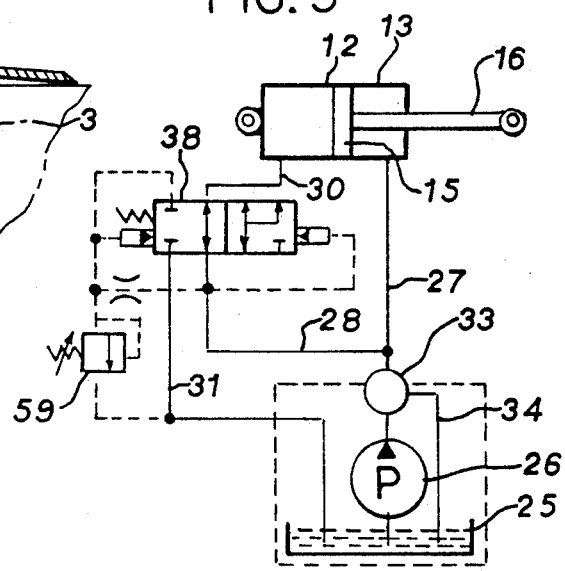
FIG. 5 is a schematic drawing of the hydraulic system for operating the dock leveler.

In accordance with the invention, the hydraulic cylinder assembly is automatically sequenced to extend the piston rod and retract the piston rod without the use of limit switches, sensors, or the like. The hydraulic system is best illustrated in FIG. 5 and includes a reservoir 25 to contain a hydraulic fluid. Pressurized fluid is pumped from reservoir 25 by pump 26 through line 27 to the upper end of cylinder 13. In addition, line 28 connects line 27 with a two-position, three-way valve assembly 29. Line 30 connects valve assembly 29 to the lower end of the cylinder, while line 31 is connected between the valve assembly and the reservoir 25. In addition, a shuttle valve 33 is located in line 27 and line 34 connects the shuttle valve with reservoir 25.

Valve 29 assembly is biased to a position where line 28 is normally in communication with line 30.

Figure 6:
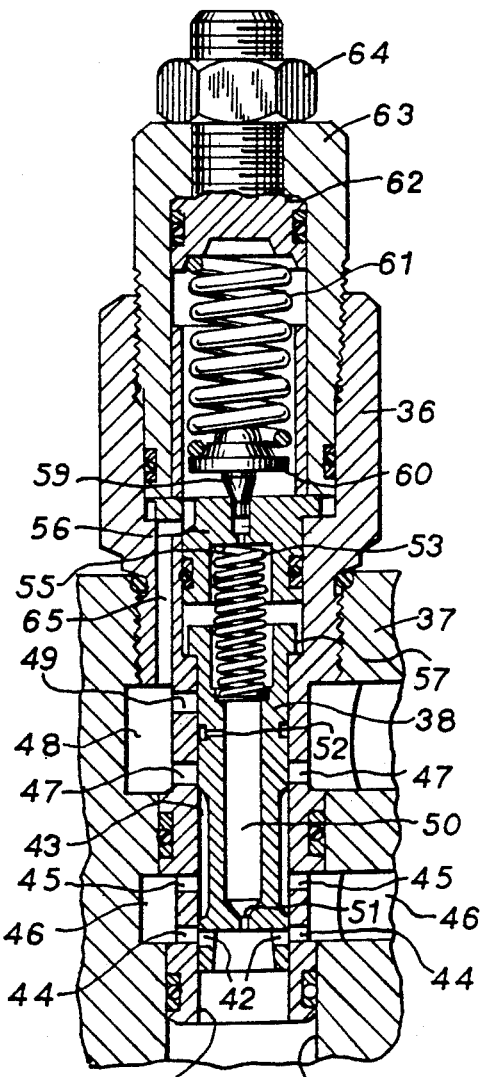
FIG. 6 is a longitudinal section of the two-position three-way valve.
Figure 7:
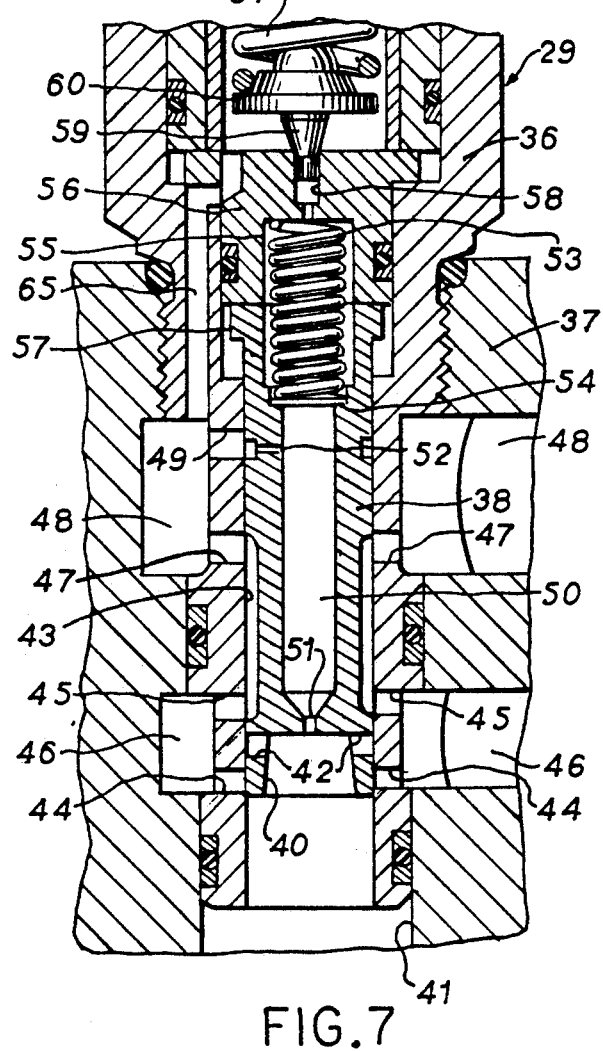
FIG. 7 is a view similar to FIG. 6 showing the valve in a second position.

The construction of valve assembly 29 is illustrated in FIGS. 6 and 7. The valve assembly 29 includes a tubular body 36 which is mounted within an opening in valve block 37 and a spool valve 38 is mounted for sliding movement within body 36. Body 36 is sealed within the opening in valve block 37 by suitable O-ring seals 39

The outer end of spool valve 38 is provided with an axial recess 40, which is in communication with passage 41 of block 37 and passage 1, in turn, is connected to line 28, so that pressurized fluid will be supplied through line 28 to passage 41.

A series of radial passages 42 extend through the wall of spool valve 38 and communicate with the axial passage 40. In addition, spool valve 38 is provided with a peripheral groove 43, which is spaced longitudinally from passages 42.

As seen in FIG. 6, valve body 36 is provided with two groups of ports 44 and 45, and in the position of the valve 38, as shown in FIG. 6, ports 44 are in registry with ports 42 of the valve. Ports 44 and 45 communicate with passage 46 in valve block 37 and the passage 46 is in communication with line 30.

The valve body 36 also has a plurality of circumferentially spaced ports 47, which communicate with an annular chamber or passage 48, and passage 48 is connected to return line 31.

In addition, valve body 36 is also provided with a port 49 which is spaced axially from ports 47 and port 49 also communicates with passage 48.

As shown in FIGS. 6 and 7, valve 38 is provided with a central axial opening 50 and the outer end of the valve is provided with a small diameter orifice 51 which provides communication between opening 50 and passage 41. In addition, valve 38 is formed with a radial port 52 that is connected to the central opening 50.

Valve 38 is biased to the position shown in FIG. 6 by a coil spring 53. One end of spring 53 bears against an internal shoulder 54 in valve 38, while the opposite end of the spring is received within an axial recess 55 in seat 56, which is mounted in the valve body 36. The force of spring 53 urges valve 38 outwardly to the position shown in FIG. 6, and outward displacement of the valve from the valve body 36 is prevented by engagement of the peripheral flange 57 on valve 38 with an internal shoulder on valve seat 36.

Valve seat 56 is provided with a small diameter central opening 58, which is enclosed by a poppet valve 59. Valve 59 includes a small diameter end which is received within opening 58 and an enlarged head 60.

To bias poppet valve 59 to a closed position, a coil spring 61 is interposed between head 60 and an adjusting screw 62, which is threaded within a central opening in cap or spring housing 63. The cap 63 is threaded within the outer end of valve body 36. By threaded adjustment of screw 62, the force of the spring 61 can be adjusted, thereby selectively varying the force required to open poppet valve 59. This adjustment is independent of the biasing force of spring 53 which biases valve spool 38 to the outer position, shown in FIG. 6.

A lock nut 64 can be engaged with the outer end of screw 62 to lock the screw in the desired position.

As shown in FIGS. 6 and 7, a longitudinal passage 65 is formed in valve body 36 and valve seat 56 and provides communication between the interior of cap 63 and chamber 48 in valve block 37. When poppet valve 59 is opened, fluid can flow from the interior of the valve 8 through the opening 57 and then through the passage 65 and chamber 48 to reservoir 25.

When it is desired to move the dock leveler from the storage position to the operative position, as shown in FIG. 4, pump 26 is operated causing pressurized fluid to be supplied through line 27 to one end of cylinder 13 and through line 28, valve assembly 29 and line 30 to the opposite end of the cylinder 13.

The fluid pressure supplied through line 28 to control valve 29 will act against valve 38 and due to the orifice 51, the pressure will be applied to both ends of the valve 38. As the force of the fluid pressure acting on the exposed area of the outer end of the valve 38 is equal to the force acting on the inner end of the valve (the sum of the force of spring 53 plus the force of the fluid pressure acting on the exposed area of the inner end), the valve 38 will be maintained in the position as shown in FIG. 6. In this position, ports 42 will communicate through ports 44 with the annular chamber 46, which in turn is connected through lines 30 to the cylinder 13, so that the pressurized fluid will be supplied to both ends of the cylinder.

As the inner face of the piston 15 has a greater surface area than the outer face of the piston, due to the attachment of the piston rod to the outer face, a differential in force is created which will move the piston 15 and extend the piston rod 16 and pivot deck plate 8 to the vertical position, as shown in FIG. 3. As the deck plate moves to the vertical position, latch bar 18 will engage rod 21 to latch the deck plate in the vertical position. When the piston 15 of cylinder 13 reaches the end of its outward stroke and bottoms out, or if the piston rod 16 hits an obstruction, the pressure in lines 27 and 28 will increase.

The increased pressure acting through valve 38 will also be applied to the inner small diameter end of poppet valve 59, which is biased to a closed position by spring 61. When the pressure increases to a predetermined value it will overcome the force of spring 61, and poppet valve 59 will open, allowing fluid to flow through opening 58 to the interior of cap 63 and then through passage 65, to annular passage 48 and then to the reservoir 25. As fluid flows through the spool 38, it passes through the small diameter orifice 51, causing a pressure drop across the orifice which is sufficient to produce a higher force on the outer end of the valve 38, as opposed to the inner end. This differential in force will move the valve 38 axially against the force of spring 53 to the position shown in FIG. 7. In this position, the ports 42 will be closed off and port 52 will be in communication through port 49 with the chamber 48 and reservoir 25, and ports 45 will communicate through peripheral groove 43 with ports 47 and chamber 48 so that fluid will flow from cylinder 13 through line 30, through valve assembly 29 and line 31 to the reservoir. Thus, the lower end of cylinder 13 will be connected through control valve 29 to the reservoir and the pressure of the fluid acting through line 27 to the upper end of the cylinder 13 will cause the piston rod to retract to move the deckplate 8 downwardly from the position shown in FIG. 3 to the position shown in FIG. 4.

As the piston rod 16 is retracted, the deck plate 8 will be pivoted downwardly and as latch bar 18 is engaged at this time, the bar will cause the lip to move outwardly in a generally curved path and into engagement with the bed of carrier 3. When the lip engages the bed of carrier 3, as shown in FIG. 4, the operator can discontinue operation of pump 26 and the pressurized fluid in line 27 will be discharged through shuttle valve 33 and line 34 to atmospheric pressure in reservoir 25. When the truck pulls away from the dock, the lip can then fall by gravity to its pendant position.

The sequence pressure, which is the pressure in excess of that required to shift the valve 38, is determined by the force of spring 61, and the return pressure, which is the pressure at which the valve 38 will return to its original position, is the pressure determined by the force of spring 53. Through operation of the adjusting screw 62, the sequence pressure can be adjusted independently of the return pressure. Thus, a low return pressure can be obtained, while providing an independent adjustment of the sequence pressure.

The invention provides a simple, effective, hydraulic system in which the valve is automatically . shifted to provide an automatic sequencing of extension and retraction of piston rod 16 by virtue of an increase of pressure in the system itself, as opposed to employing an auxiliary shifting mechanism, such as sensors, limit switches, or the like.

By utilizing the hydraulic cylinder unit 12 to elevate the deck plate and move the deck plate and lip forwardly into engagement with the truck bed, the manual labor normally associated with these functions is eliminated.

Various modes of carrying out the invention are contemplated as being within the scope of the following claims particularly pointing out and distinctly claiming the subject matter which is regarded as the invention.

I claim:

1. An edge-of-dock leveler to be mounted on the front of a loading dock, comprising a supporting structure secured to the dock, a deck plate having a rear edge pivotally connected to the supporting structure, a lip having a rear edge connected to a forward edge of the deck plate, said deck plate and lip being movable from a first storage position where said deck plate is generally horizontal and said lip is pendant to a second elevated position where the deck plate is located generally vertically and the lip is disposed at an acute angle with respect to the deck plate, to a third operating position where the lip forms an extension to the deck plate and rests on the bed of a carrier located in front of the dock, latch means connected to the lip, an abutment on the supporting structure and disposed to be engaged by the latch means when the deck plate is moved to the second position, engagement of the latch means with said abutment latching said deck plate in said second position, hydraulic cylinder means interconnecting the supporting structure and the deck plate and including a cylinder member and a piston member slidably mounted in said cylinder member, one of said members being pivotally connected to said supporting structure and the other of said members being pivotally connected to said deck plate, a hydraulic system including pumping means for supplying hydraulic fluid to said cylinder member to extend said piston member and pivot said deck plate upwardly from the storage position to said second position, and means responsive to a predetermined increase in pressure in said hydraulic system in excess of the pressure required to pivot said deck plate upwardly caused by extension of said piston member thus automatically retracting said piston member and pivoting said deck plate to the third position.

2. An edge-of-dock dock leveler to be mounted on the front of a loading dock, comprising a supporting structure secured to the dock, a deck plate having a rear edge pivotally connected to the supporting structure, a lip having a rear edge connected to a forward edge of the deck plate, said deck plate being movable from a first storage position where said deck plate is generally horizontal and said lip is pendant to a second elevated position where said deck plate is generally vertical and said lip is disposed at an acute angle with respect to said deck plate to a third operating position where said deck plate is generally horizontal and said lip forms an extension to the deck plate and rests on the bed of a carrier located in front of the dock, latch means pivotally connected to the deck plate, an abutment connected to the supporting structure and disposed to be engaged by said latch means as the deck plate is moved to the second position to thereby lock the deck plate in said second position, means responsive to movement of the deck plate from the second position toward the third position for moving the forward edge of the lip in an upward and forward path of travel to enable the forward edge of the lip to clear the bed of said carrier, hydraulic cylinder means interconnecting said supporting structure and said deck plate and including a cylinder member and a piston member slidable relative to said cylinder member, one of said members connected to the supporting structure and the other of said members being connected to said deck plate, a hydraulic system including pumping means for supplying hydraulic fluid at a first pressure to said cylinder member to thereby extend said piston member and move said deck plate upwardly from said first position to said second position, and means responsive to a second pressure in said cylinder member greater than said first pressure and caused by termination of extension of said piston member thus automatically retracting said piston member and moving said deck plate from said second position to said third position.

3. The dock leveler of claim 2, and including means for maintaining the lip at an acute angle with respect to the deck plate when the deck plate is in the second position.

4. The dock leveler of claim 1, wherein said hydraulic system includes a reservoir, first conduit means connecting the reservoir with a first end of said cylinder member, second conduit means connected to said reservoir, third conduit means connected to a second end of said cylinder member, said means for supplying hydraulic fluid comprising pumping means operably connected to said first and second conduit means, fourth conduit means connected to said reservoir, valve means connecting said second conduit means and said third conduit means and said fourth conduit means, said valve means having a first position wherein said second conduit means is connected to said third conduit means so that pressurized fluid will be supplied to both ends of said cylinder member to cause extension of said piston member, said valve means having a second position where said third conduit means is connected to said fourth conduit means, said means responsive to a predetermined increase in pressure acts to shift said valve means from said first position to said second position and retract said piston member.

5. The dock leveler of claim 4, and including biasing means for biasing said valve means to said first position.

6. An edge-of-dock dock leveler to be mounted on the front of a loading dock, comprising a supporting structure secured to the dock, a deck plate having a rear edge pivotally connected to the supporting structure, a lip having a rear edge connected to a forward edge of the deck plate, said deck plate and lip being movable from a first storage position where said deck plate is generally horizontal and said lip is pendant to a second elevated position whereat the deck plate is located generally vertically and the lip is disposed at an acute angle with respect to the deck plate, to a third operating position where the lip forms an extension to the deck plate and rests on the bed of a carrier located in front of the dock, latch means connected to the deck plate, an abutment on the supporting structure and disposed to be engaged by the latch means when the deck plate is moved to the second position, engagement of the latch means with said abutment latching said deck plate in said second position, a cylinder pivotally connected to said supporting structure, a piston slidable within said cylinder, a piston rod connected to said piston and extending through the upper end of said cylinder and being pivotally connected to said deck plate, a reservoir for hydraulic fluid, first conduit means connecting said reservoir to the upper end of said cylinder, second conduit means connected to said reservoir, pumping means for supplying pressurized fluid to said first and second conduit means, third conduit means connected to the lower end of said cylinder, fourth conduit means connected to said reservoir, valve means interconnecting said second, third and fourth conduit means and having a first position wherein said second conduit means is connected to said third conduit means so that pressurized fluid will be supplied to both ends of said cylinder to cause extension of said piston rod and pivot said deck plate from the first position to the second position, said valve means having a second position where said third conduit means is connected to said fourth conduit means whereby pressurized fluid in the upper end of said cylinder will move said piston downwardly to retract said piston rod and move said deck plate from said second position to said third position and fluid will be returned through said fourth conduit means to said reservoir, and means responsive to an increase in pressure in said second conduit means caused by full extension of said piston rod to automatically shift said valve means from said first position to said second position.

7. The dock leveler of claim 6, and including biasing means for biasing said valve means to the first position.

8. The dock leveler of claim 7, and including adjusting means operably connected to said biasing means for adjusting the force of said biasing means to thereby adjust the pressure at which said valve means will shift from said first position to said second position.

* * * * *